(12) United States Patent
Ye et al.

(10) Patent No.: US 11,271,396 B2
(45) Date of Patent: *Mar. 8, 2022

(54) SYSTEM OF PROVIDING POWER TO CHIP ON MAINBOARD

(71) Applicant: Delta Electronics (Shanghai) Co., Ltd., Shanghai (CN)

(72) Inventors: Haoyi Ye, Shanghai (CN); Jianhong Zeng, Shanghai (CN); Xiaoni Xin, Shanghai (CN); Shouyu Hong, Shanghai (CN); Min Zhou, Shanghai (CN); Yiqing Ye, Shanghai (CN); Pengkai Ji, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 48 days.

This patent is subject to a terminal disclaimer.

(21) Appl. No.: 16/944,560

(22) Filed: Jul. 31, 2020

(65) Prior Publication Data

US 2020/0366091 A1 Nov. 19, 2020

Related U.S. Application Data

(63) Continuation-in-part of application No. 16/251,554, filed on Jan. 18, 2019, now Pat. No. 10,845,853.

(30) Foreign Application Priority Data

Feb. 1, 2018 (CN) .......................... 201810103774.5

(51) Int. Cl.
*H02J 1/00* (2006.01)
*H02M 3/00* (2006.01)
(Continued)

(52) U.S. Cl.
CPC .............. *H02J 1/106* (2020.01); *G06F 1/263* (2013.01); *H02M 3/1584* (2013.01)

(58) Field of Classification Search
CPC ......... H02M 3/02; H02M 3/1584; G06F 1/26; G06F 1/189
See application file for complete search history.

(56) References Cited

U.S. PATENT DOCUMENTS 7,456,617 B2 * 11/2008 Chapuis .................... G06F 1/26
 323/267
9,001,544 B2 * 4/2015 Itoh ..................... H02M 7/4837
 363/132

(Continued)

FOREIGN PATENT DOCUMENTS

CN 1389912 A 6/2002
CN 101494414 A 1/2008
(Continued)

*Primary Examiner* — Jared Fureman
*Assistant Examiner* — Esayas G Yeshaw
(74) *Attorney, Agent, or Firm* — Kirton McConkie; Evan R. Witt

(57) ABSTRACT

The disclosure provides a system of providing power to a chip on a mainboard. The system comprises at least one preceding-stage power supply module located on a surface of a mainboard, being DC-DC converters, and configured to receive a first DC voltage and to provide a second DC voltage; and at least one post-stage power supply module located on the same surface of the preceding-stage power supply module of the mainboard. Wherein the post-stage power supply module is electrically connected to the preceding-stage power supply module to receive the second DC voltage, the preceding-stage power supply module and the post-stage power supply module are disposed at same side of the chip, the post-stage power supply module provides a third DC voltage to the chip. A profile projection of the preceding-stage power supply module and the correspond- (Continued)

(a) Circuit diagram (b) Waveform diagram ing post-stage power supply module are overlapped with each other over 50%.

22 Claims, 22 Drawing Sheets

(51) Int. Cl.
  *H02J 1/10* (2006.01)
  *H02M 3/158* (2006.01)
  *G06F 1/26* (2006.01)

(56) References Cited

U.S. PATENT DOCUMENTS

| | | | |
|---|---|---|---|
| 10,044,268 B1* | 8/2018 | Lidsky | H02J 1/00 |
| 2009/0167087 A1* | 7/2009 | Clemo | H02M 3/33569 |
| | | | 307/43 |
| 2015/0070940 A1* | 3/2015 | Sato | H02M 3/1584 |
| | | | 363/17 |
| 2015/0249403 A1* | 9/2015 | Sato | H02M 7/25 |
| | | | 363/127 |
| 2019/0033938 A1* | 1/2019 | Ou Yang | G06F 1/3287 |

FOREIGN PATENT DOCUMENTS

| | | |
|---|---|---|
| CN | 103140923 A | 9/2012 |
| CN | 105449987 A | 9/2014 |
| CN | 105824385 A | 1/2015 |
| CN | 106329930 A | 7/2015 |
| CN | 105653765 A | 12/2015 |

\* cited by examiner

SYSTEM OF PROVIDING POWER TO CHIP ON MAINBOARD

CROSS-REFERENCE TO RELATED APPLICATION

This application is a continuation-in-part application of U.S. application Ser. No. 16/251,554 filed on Jan. 18, 2019 and entitled "SYSTEM OF PROVIDING POWER TO CHIP ON MAINBOARD", which claims priority to China Patent Application No. 201810103774.5, filed on Feb. 1, 2018. The entire contents of the above-mentioned patent applications are incorporated herein by reference for all purposes.

FIELD OF THE INVENTION

The disclosure relates to the technical field of power supplies on mainboard, particularly to a system of providing power to a chip on a mainboard.

BACKGROUND OF THE INVENTION

With the improvement of requirements for smart living of people, the demand for data processing in society is growing. The core of data processing lies in various types of intelligent processor chips, such as central processing units (CPUs), graphics processing units (GPUs), field programmable gate arrays (FPGAs) and application specific integrated circuits (ASICs). The processing speed of the processor chip for data, that is, the performance, is one of the key factors to achieve a certain degree of intelligence. Because the processor chip is very expensive, both the processor chip provider and the user have done a lot of optimization work on how to fully exert the performance of the processor chip. The exertion of the performance of the processor chip must be based on a stable supply voltage, so the steady-state performance and dynamic performance of the power supply to the processor chip are key factors. At present, the global energy consumption in data processing reaches hundreds of billions or even trillions of kilowatt-hours per year, and it continues to rise as the demand of data processing increases. Therefore, the performance per watt becomes an important index for measuring a processor chip, a server system and even the entire data center.

In order to reduce transmission loss, the power supply structure of a data center is constantly evolving. It is a trend to adopt a bus voltage of 48V or higher, such as a high DC (Direct current) bus voltage of 400V, to continuously improve power consumption of a data center. The increase of the bus voltage may increase the input of a point-of-load (POL) power supply from 12V to 48V or even to 400V. The increase of input voltage greatly increases the voltage difference between the input and output of a power supply on a mainboard, which poses a new challenge to the power supply of the processor chip in a server.

The two-stage structure is an effective solution to solve the huge difference between the input and output voltage of a power supply on a mainboard. FIG. 1 is a schematic diagram of a circuit of a system of providing power to a chip on a mainboard in prior art. As shown in FIG. 1, the input voltage of the preceding-stage power supply module 2 is 12V, 48V or 400V, the preceding-stage power supply module 2 converts the input power into a certain voltage and outputs it to the post-stage power supply module 3, and the post-stage power supply module 3 finally outputs a DC voltage that is ≤2V to be used by the chip 1, wherein the chip 1 is, for example, a processor chip.

As the semiconductor process is improved continuously, the supply voltage of the processor chip drops continuously. For example, the supply voltage of a chip using a 14 nm process is around 0.8V, while the voltage of an integrated circuit (IC) of a 10 nm process will drop to 0.6V. However, due to the increase of the number of transistors in a single processor chip and the increase of the operating frequency of the transistors, the power required by the chip is not reduced, so the power supply current to the chip may increase. The continuous reduction of voltage and the continuous increase of current put forward higher requirements for the performance of the power supply on a mainboard.

FIG. 2 is a schematic diagram of a circuit of another system of providing power to a chip on a mainboard in prior art. As shown in FIG. 2, the input voltage of the preceding-stage power supply module 2 is 12V, 48V or 400V. The preceding-stage power supply module 2 converts the input power into a voltage that is ≤6V and outputs it to the post-stage power supply module 3', and the post-stage power supply module 3' finally outputs a DC voltage that is ≤2V to be used by the chip 1. Using a low bus voltage, for example, less than 6V between the two power stages, that is, the preceding-stage power supply module 2 and the post-stage power supply module 3', is more advantageous for use of high frequency switching elements in the post-stage power supply module 3', so as to improve dynamic response performance of the post-stage power supply module 3' without sacrificing the efficiency of the power converter.

When considering the dynamic change of the supply voltage for the processor chip along with the current of the processor chip, besides the dynamic response performance of the power module itself, one must consider the transmission impedance $Z_{PDN}$, in the power supply path. FIG. 3 is an equivalent circuit diagram of a system of providing power to a chip on a mainboard in prior art, that is, an equivalent circuit of the system of providing power to a chip on a mainboard in FIG. 1 or FIG. 2. The FIG. 3 is used for explaining the relationship among the dynamic current, the power supply impedance, the transmission impedance and the voltage variation in FIG. 1 or FIG. 2. The power supply, that is, the combination of the preceding-stage power supply module 2 and the post-stage power supply module 3 (or 3'), is equivalent to an ideal voltage source E in series with an equivalent output impedance $Z_{PS}$, and the chip 1 is equivalent to a current source load R having high frequency transition. When the current flowing through the chip 1 changes by $\Delta i$, the voltage changed on the power supply input port of the chip 1 is $\Delta v = \Delta i *(Z_{PS}+Z_{PDN})$. It can be seen that the source impedance $Z_{PS}$ and the transmission impedance $Z_{PDN}$ have a direct impact on the magnitude of the variation of the processor supply voltage.

As the above mentioned, the development trend of the operating voltage of the processor chip will be continuous decline, which means that the proportion of the voltage change $\Delta v$ of the same magnitude in the required operating voltage will be larger and larger, so the voltage variation amplitude $\Delta v$ must be reduced to meet the same voltage accuracy requirement. At the same time, the operating current of the processor chip is still likely to increase, so the potential current change $\Delta i$ is likely to increase, which means that the entire power supply loop, that is, the combination of the preceding-stage power supply module 2 and the post-stage power supply module 3 (or 3') must ensure a smaller Δv at a higher Δi, therefore, higher requirements are imposed on the power supply impedance and the transmission impedance.

FIG. 4 is an equivalent circuit diagram of another system of providing power to a chip on a mainboard in prior art, that is, another equivalent circuit of the system of providing power to a chip on a mainboard in FIG. 2 or FIG. 3. As shown in FIG. 4, in the two-stage power supply structure shown in FIG. 2 or FIG. 3, the power supply impedance is composed of the following parts: the equivalent output impedance $Z_{PS1}$ of the preceding-stage power supply module 2, the impedance $Z_{BUS}$ of the intermediate low-voltage bus line, the equivalent output impedance $Z_{PS2}$ of the post-stage power supply module 3 (or 3') and the transmission impedance $Z_{PDN}$ between the post-stage power supply module 3 (or 3') and the chip 1. In FIG. 4, the post-stage power supply module 3 (or 3') is equivalent to a model in which an ideal transformer having a certain voltage conversion ratio is connected in series with the equivalent output impedance $Z_{PS2}$, where N represents the multiple of the input voltage to the output voltage of the post-stage power supply module 3 (or 3').

FIG. 5 is a circuit diagram of a post-stage power supply module of a system of providing power to a chip on a mainboard in prior art, and a waveform diagram of corresponding voltages and currents during load transition, for explaining the problems exists in the system of providing power to a chip on a mainboard in FIG. 2 or FIG. 3. As shown in the circuit diagram (a) in FIG. 5, the post-stage power supply module 3 (or 3') of the system of providing power to a chip on a mainboard in prior art is, for example, a typical step-down chopper (Buck) circuit composed of a switch K, a diode D, an inductor L and a capacitor C. The waveform diagram (b) in FIG. 5 shows a current $i_{load}$ and a voltage Vo (i.e., the output voltage Vo of the Buck circuit) applied to the chip 1, a current $i_L$ on the inductor L and a duty ratio d of the switch K (i.e., the duty ratio of the Buck circuit) that varies along with time.

When the post-stage power supply module 3 (or 3') is a Buck circuit, the multiple N of the foregoing FIG. 4 is equal to the ratio of the input voltage Vin of the Buck circuit to the output voltage Vo of the Buck circuit, i.e., 1/d.

From FIG. 4, it can be obtained that the total impedance from the preceding-stage power supply module 2 to the power supply input port of the chip 1

$$Z=(Z_{PS1}+Z_{BUS})/N^2+Z_{PS2}+Z_{PDN} \quad \text{(Formula 1)}.$$

When the post-stage power supply module 3 (or 3') is a Buck circuit, $$Z=(Z_{PS1}+Z_{BUS})*d^2+Z_{PS2}+Z_{PDN} \quad \text{(Formula 2)}.$$

When the load of the chip 1 is changed from light load to heavy load, in order to make the current $i_L$ of the output inductor L catch up with the load current $i_{Load}$ as soon as possible, the Buck circuit must increase the duty ratio d to the maximum, thereby reducing the drop of the output voltage Vo of the load side, the course of which can be illustrated by the waveform (b) in FIG. 5. In actual use, the maximum duty ratio of the Buck circuit during load dynamic transition is very close to 1, i.e., d≈1, so, during the transient course due to the dynamic increase of the load, the impedance of the power supply path $$Z \approx (Z_{PS1}+Z_{BUS})*1^2+Z_{PS2}+Z_{PDN}=Z_{PS1}+Z_{BUS}+Z_{PS2}+Z_{PDN} \quad \text{(Formula 3)},$$

that is, both the impedance $Z_{PS1}$ of the preceding-stage power supply module 2 and the bus impedance $Z_{BUS}$ between the preceding and post-stage power supply modules are directly expressed in the impedance of the entire power supply circuit, so, in order to meet the increasing dynamic requirement of the processor chip load, all impedances in the formula 3 should be reduced.

Although the post-stage power supply module 3' in the two-stage power supply structure shown in FIG. 2 can employ a high frequency power supply module, to reduce the equivalent output impedance $Z_{PS1}$ of the preceding-stage power supply module 2 and the equivalent output impedance $Z_{PS2}$ of the post-stage power supply module 3', the bus voltage between the preceding and post-stage power supply modules is low, resulting in a large bus current, which puts higher requirements on the bus impedance, therefore, more copper foil is needed for power transmission on the wiring.

In addition, the spatial arrangement of the system of providing power to a chip on a mainboard in prior art is limited by the circuit board wiring. FIG. 6 is a schematic diagram of the spatial arrangement of a system of providing power to a chip on a mainboard in prior art. As shown in the top view (a) and the side view (b) of FIG. 6, thousands of high speed signal lines 4 are distributed around the chip 1. When both the preceding-stage power supply module 2 and the post-stage power supply module 3 are placed at the same side of the chip 1, since the post-stage power supply module 3 supplies all power for the chip 1, the volume size of the post-stage power supply module 3 is large. In order to avoid intervening the area of the high speed signal lines 4, the preceding-stage power supply module 2 and the post-stage power supply module 3 cannot be close to the chip 1, thus, the impedance $Z_{PDN}$ of the transmission path from the preceding-stage power supply module 2 and the post-stage power supply module 3 to the chip 1 cannot be lowered.

In summary, the power supply structure of the power supply on a mainboard involved in the prior art cannot well meet the development requirements of the future processor chip for dynamic response of the power supply on a mainboard.

SUMMARY OF THE INVENTION

The object of the present disclosure is to provide a system of providing power to a chip on a mainboard, so as to at least partly overcome the above-mentioned technical problems due to limitations and disadvantages of the related art.

Other features and advantages of the present disclosure will become apparent from the following detailed description, or will be partly obtained by practice of the present disclosure.

In accordance with an aspect of the present disclosure, there is provided an assembly structure of providing power to a chip. The assembly structure includes at least one preceding-stage power supply module and at least one post-stage power supply module. The preceding-stage power supply module is a DC-DC converter located on a surface of a mainboard and is configured to receive a first DC voltage and to provide a second DC voltage. The post-stage power supply module is a DC-DC converter located on the same surface of the preceding-stage power supply module of the mainboard. The post-stage power supply module is electrically connected to the preceding-stage power supply module to receive the second DC voltage. The preceding-stage power supply module and the post-stage power supply module are disposed at same side of the chip. The post-stage power supply module provides a third DC voltage to the chip. A profile projection of the preceding-stage power supply module and the corresponding post-stage power supply module are overlapped with each other over 50%.

In accordance with another aspect of the present disclosure, there is provided an assembly structure of providing power to a chip located on a mainboard. The assembly structure includes at least one preceding-stage power supply module and at least one post-stage power supply module. The preceding-stage power supply module is a DC-DC converter and is configured to receive a first DC voltage and to provide a second DC voltage. The post-stage power supply module is a DC-DC converter. The post-stage power supply module is electrically connected to the preceding-stage power supply module to receive the second DC voltage. The post-stage power supply module provides a third DC voltage to the chip. A projection on the mainboard of the preceding-stage power supply module and the corresponding post-stage power supply module are overlapped with each other over 50%.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 7:
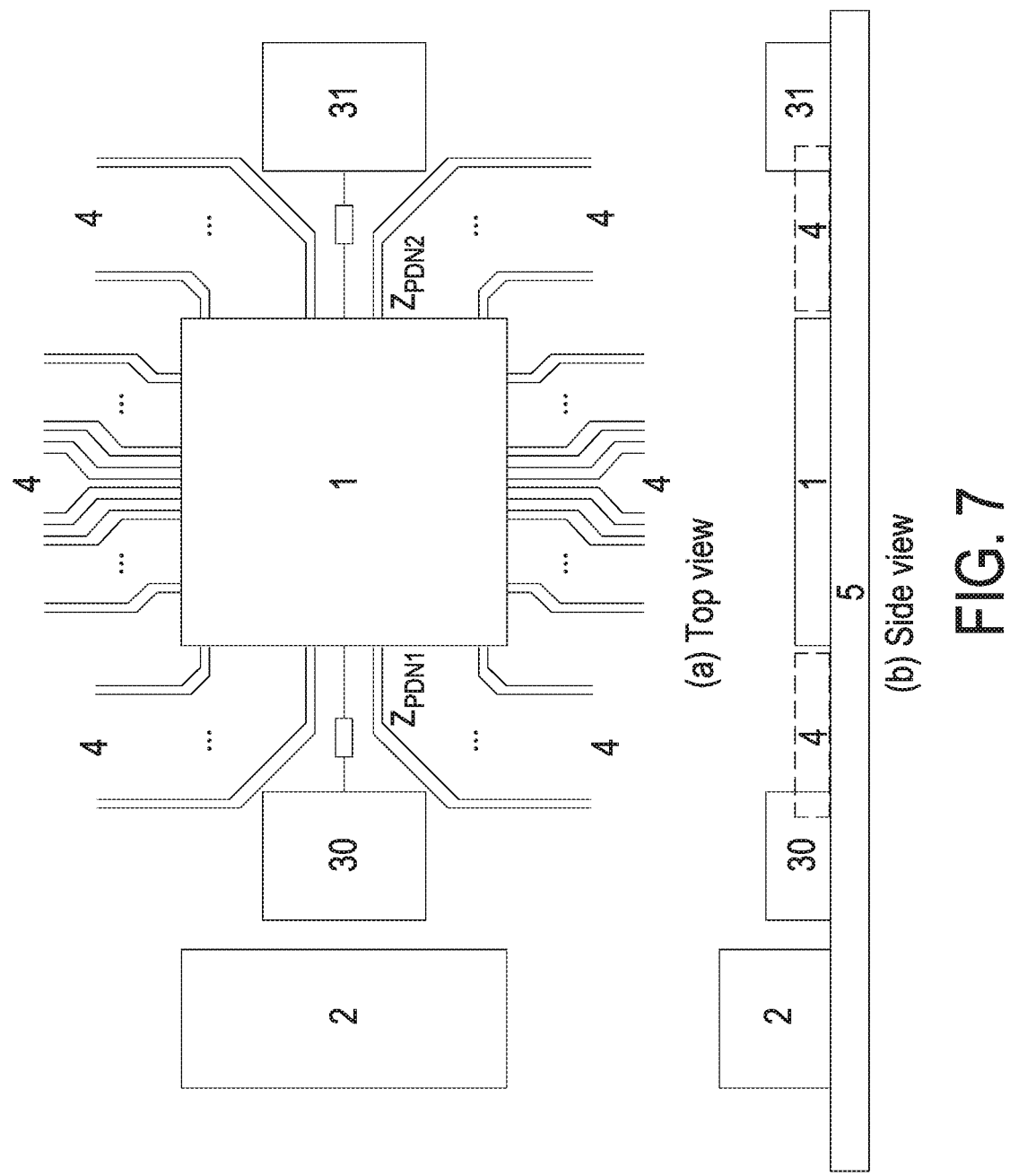
FIG. 7 is a schematic diagram of the spatial arrangement of a system of providing power to a chip on a mainboard according to an embodiment of the present disclosure.

FIG. 7 is a schematic diagram of the spatial arrangement of a system of providing power to a chip on a mainboard according to an embodiment of the present disclosure. As shown in the top view (a) and the side view (b) of FIG. 7, the system of providing power to a chip on a mainboard of the present disclosure includes a preceding-stage power supply module 2, a first post-stage power supply module 30 and a second post-stage power supply module 31, for providing power to a chip 1 disposed on a mainboard 5, wherein the chip 1 is, for example, a processor chip.

The preceding-stage power supply module 2 is located on the mainboard 5. The preceding-stage power supply module 2 is a DC-DC converter, and is configured to receive a first DC voltage (e.g., 400V, 48V, 12V, etc.) and to provide a second DC voltage (e.g., 48V, 12V, 6V, etc.), wherein the first DC voltage is greater than the second DC voltage.

Both the first post-stage power supply module 30 and the second post-stage power supply module 31 are located on the mainboard 5, and are DC-DC converters, wherein both the first post-stage power supply module 30 and the second post-stage power supply module 31 can be electrically connected to the preceding-stage power supply module 2 through the wiring on the mainboard 5, so as to receive the second DC voltage. The first post-stage power supply module 30 is disposed at the first side of the chip 1, and the second post-stage power supply module 31 is disposed at the second side of the chip 1. As shown in FIG. 7, the first side and the second side are opposite to each other. The distance on the mainboard 5 between the first post-stage power supply module 30 and the chip 1 is less than or equal to the distance between the preceding-stage power supply module 2 and the chip 1. The distance on the mainboard 5 between the second post-stage power supply module 31 and the chip 1 is less than or equal to the distance between the preceding-stage power supply module 2 and the chip 1. The first post-stage power supply module 30 provides a third DC voltage (e.g., 2V) to the chip 1, and the second DC voltage is greater than the third DC voltage. The second post-stage power supply module 31 provides a fourth DC voltage (for example, 1V) to the chip 1, and the second DC voltage is greater than the fourth DC voltage. That is, the input voltages of the first post-stage power supply module 30 and the second post-stage power supply module 31 are greater than their output voltages, respectively. The preceding-stage power supply module and the two post-stage power supply modules can be connected through the wiring on the mainboard 5.

Figure 1:
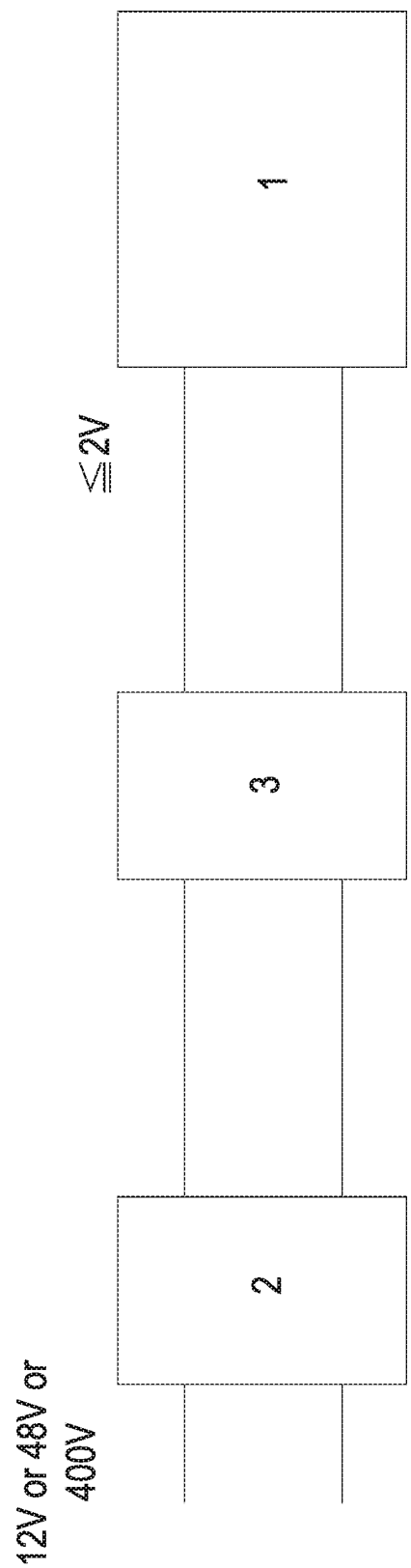
FIG. 1 is a schematic diagram of a circuit of a system of providing power to a chip on a mainboard in prior art.
Figure 2:
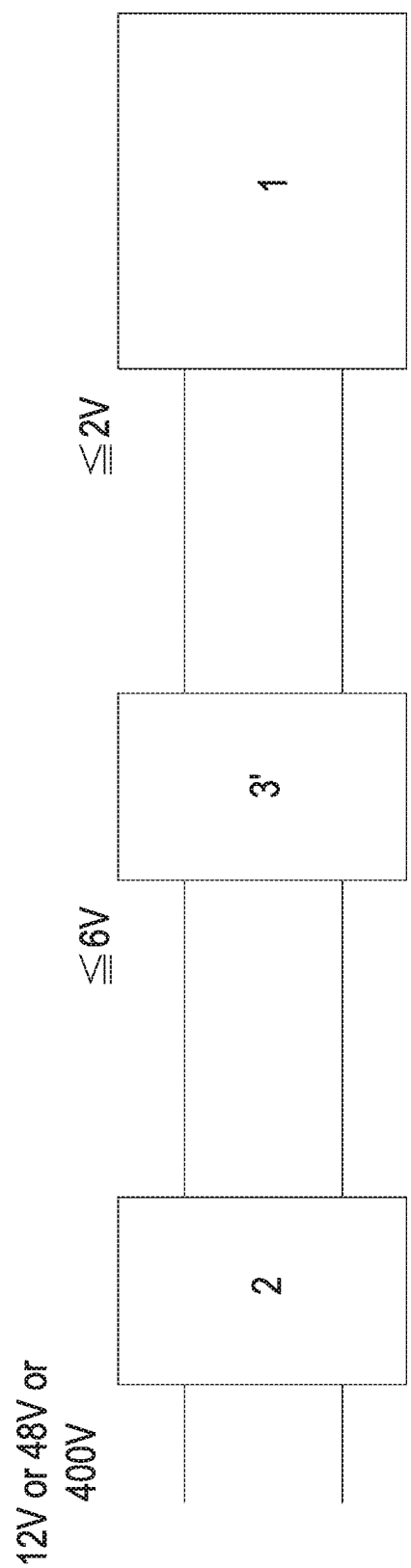
FIG. 2 is a schematic diagram of a circuit of another system of providing power to a chip on a mainboard in prior art.
Figure 3:
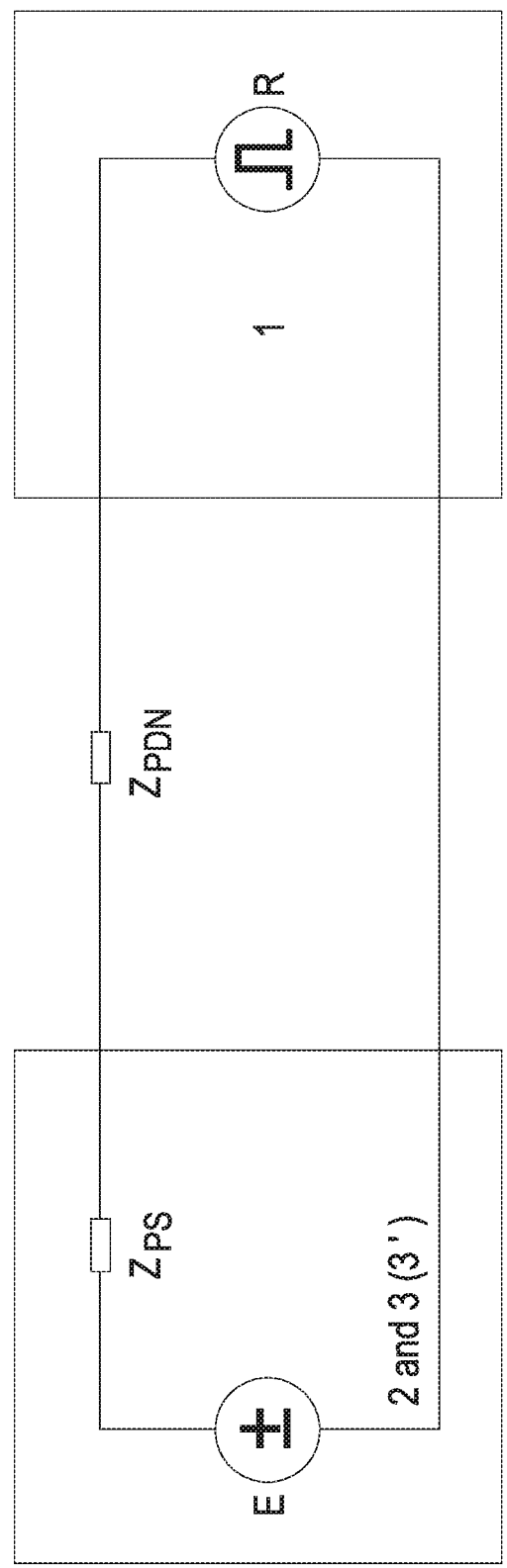
FIG. 3 is an equivalent circuit diagram of a system of providing power to a chip on a mainboard in prior art.
Figure 4:
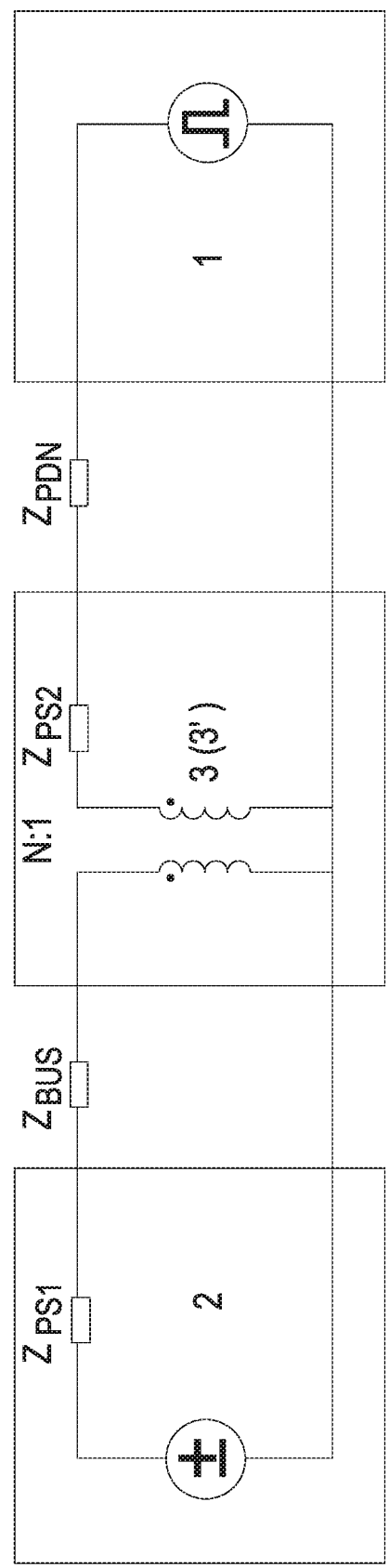
FIG. 4 is an equivalent circuit diagram of another system of providing power to a chip on a mainboard in prior art.
Figure 5:
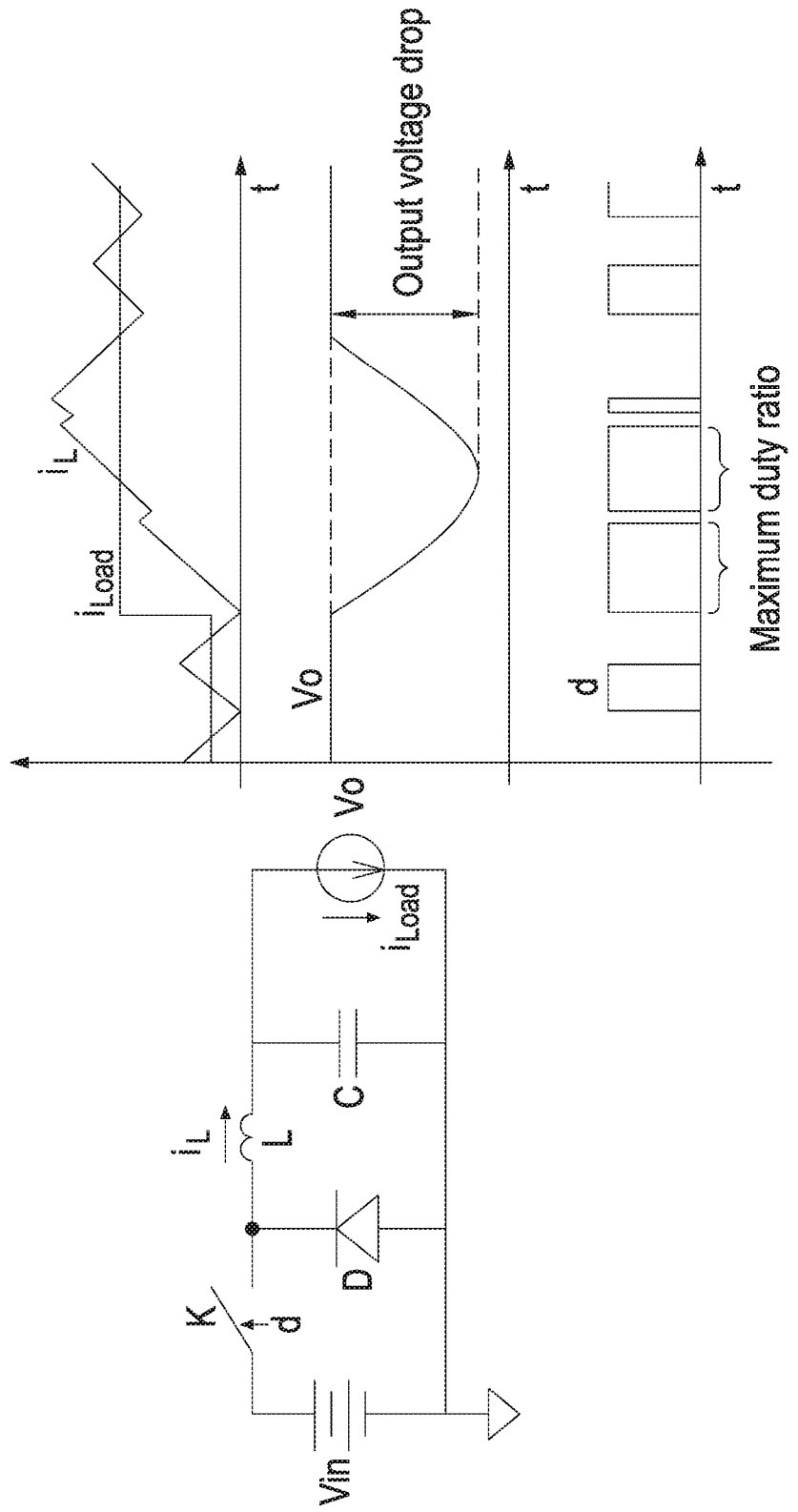
FIG. 5 is a circuit diagram of a post-stage power supply module of a system of providing power to a chip on a mainboard in prior art, and a waveform diagram of corresponding voltages and currents during load transition.
Figure 6:
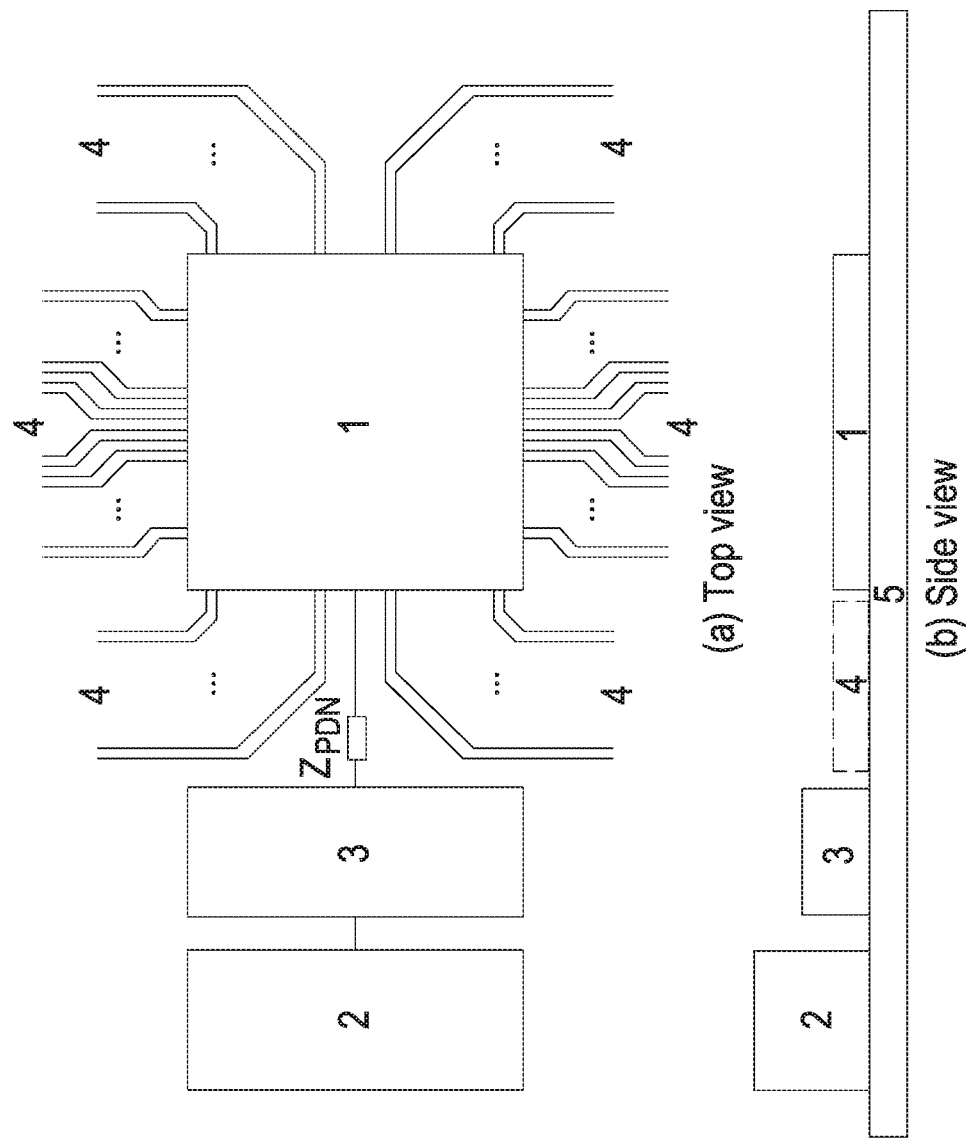
FIG. 6 is a schematic diagram of the spatial arrangement of a system of providing power to a chip on a mainboard in prior art.

Comparing the system of providing power to a chip on a mainboard according to an embodiment of the present disclosure shown in FIG. 7 with the system of providing power to a chip on a mainboard in prior art shown in FIG. 6, the voltage fluctuation caused by the impedance between the post-stage power supply module 3 and the chip 1 can be reduced by more than a half in the embodiment.

In the system of providing power to a chip on a mainboard according to an embodiment of the present disclosure shown in FIG. 7, the transmission path between the post-stage power supply module 3 and the chip 1 in the two-stage power supply is changed from the original one to the present two, so the current in each path becomes about half of the original. For chip 1, the impedances $Z_{PDN1}$ and $Z_{PDN2}$ of the two paths are equivalent to be in parallel.

In addition, after the post-stage power supply module 3 is divided into two, that is, the first post-stage power supply module 30 and the second post-stage power supply module 31, the volume of each of which can be half of the original post-stage power supply module 3. In the spatial arrangement of a system of providing power to a chip on a mainboard in prior art shown in FIG. 6, because of the large size of the single post-stage power supply module 3, it cannot utilize the area of the mainboard where high speed signal lines 4 are distributed in high density. On the other hand, in the spatial arrangement of a system of providing power to a chip on a mainboard according to an embodiment of the present disclosure shown in FIG. 7, the number of the post-stage power supply modules connected to the preceding-stage power supply module is increased, which can share the power of the chip 1, so, the volumetric size of each of the post-stage power supply modules can be reduced. Since the sizes of the first post-stage power supply module 30 and the second post-stage power supply module 31 are reduced, the first post-stage power supply module 30 and the second post-stage power supply module 31 can utilize the area of the mainboard where the high speed signal lines 4 are distributed in high density, thereby they can be closer to the chip 1, and because of their small sizes, they can even be disposed between two adjacent wirings of the high speed signal lines 4 that are spread by an angle. Since the path between each of the first post-stage power supply module 30 and the second post-stage power supply module 31 and the chip 1 becomes shorter, both of the transmission impedances $Z_{PDN1}$ and $Z_{PDN2}$ shown in FIG. 7 are smaller than the transmission impedance $Z_{PDN}$ between the post-stage power supply module 3 and the chip 1 shown in FIG. 6.

In this way, the transmission impedance between the first post-stage power supply module 30 and the second post-stage power supply module 31 and the chip 1 in the system of providing power to a chip on a mainboard according to an embodiment of the present disclosure shown in FIG. 7 is smaller than ½ of the transmission impedance between the post-stage power supply module 3 and the chip 1 in the system of providing power to a chip on a mainboard in prior art shown in FIG. 6, that is, $Z_{PDN1}//Z_{PDN2}<Z_{PDN}/2$, therefore, under the same load change condition, by adopting the system of providing power to a chip on a mainboard according to an embodiment of the present disclosure shown in FIG. 7, the voltage fluctuation caused by the impedance between the first post-stage power supply module 30 and the second post-stage power supply module 31 and the chip 1 may be reduced to less than ½ of that in the system of providing power to a chip on a mainboard in prior art shown in FIG. 6. Considering functional requirements of the preceding-stage power supply module and the post-stage power supply module in the two-stage power supply architecture, the preceding-stage power supply module and the post-stage power supply module can be designed respectively to have different output impedances and operating frequencies.

In addition, a plurality of post-stage power supply modules can be designed with different output impedances, different operating frequencies, different dynamic response speeds, etc., so as to reasonably distribute performance needed by the chips, among the plurality of post-stage power supply modules.

Figure 8:
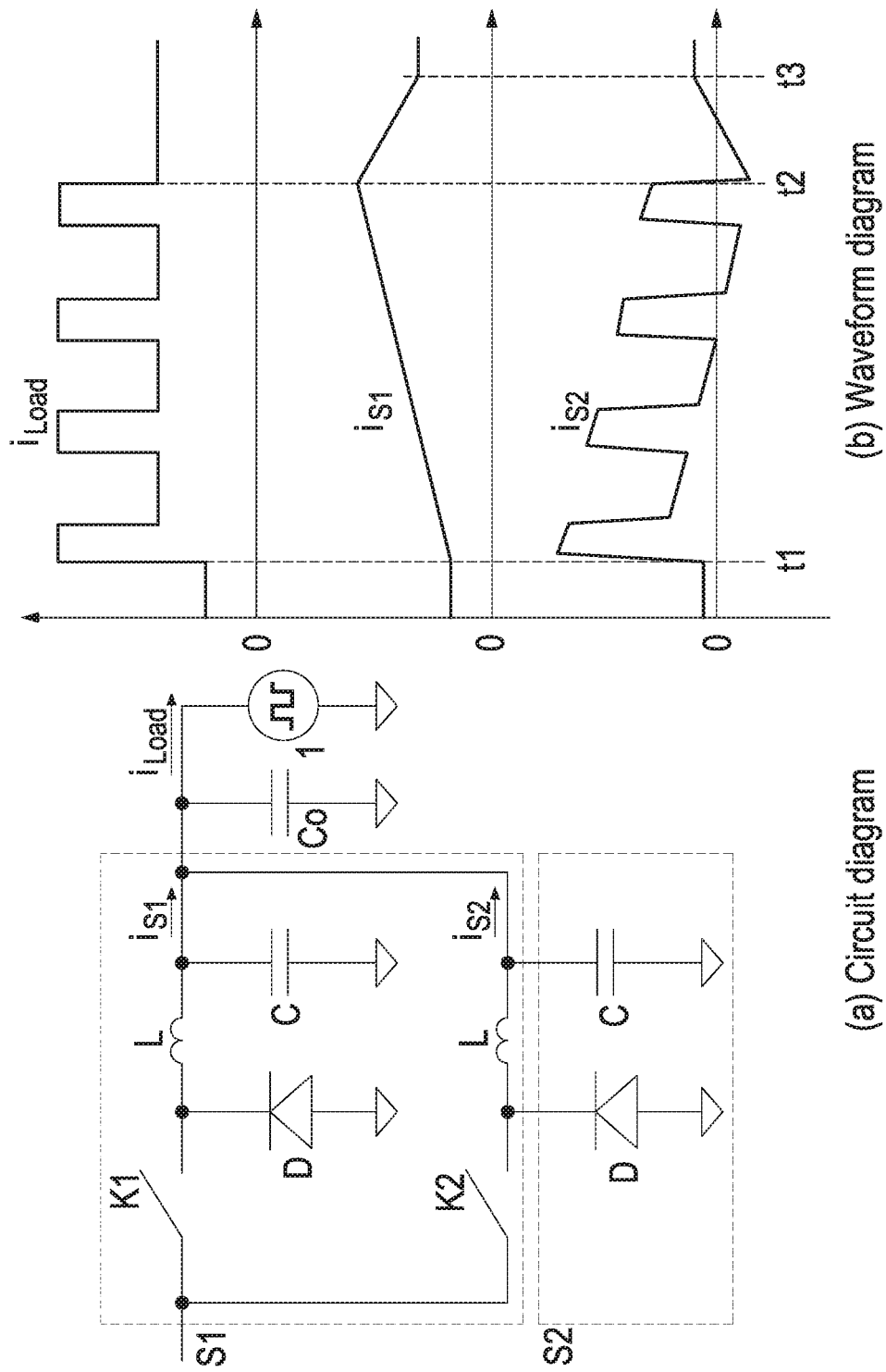
FIG. 8 is a circuit diagram of a post-stage power supply module of the system in FIG. 7, and a waveform diagram of corresponding currents during load transition.

FIG. 8 is a circuit diagram of a post-stage power supply module of the system in FIG. 7, and a waveform diagram of corresponding currents during load transition, which can intuitively explain task assignment among a plurality of post-stage power supply modules. As shown in the circuit diagram (a) of FIG. 8, in the power supply system of the present embodiment, the first post-stage power supply module 30 is a post-stage power supply module S1 having a low operating frequency, and the second post-stage power supply module 31 is a post-stage power supply module S2 having a high operating frequency, the post-stage power supply module S1 having the low operating frequency and the post-stage power supply module S2 having the high operating frequency provide power to the chip 1 in a manner of input parallel and output parallel, wherein the post-stage power supply modules S1 and S2, for example, both are typical Buck circuits. That is to say, the post-stage power supply module S1 is a typical Buck circuit composed of a switch K1, a diode D, an inductor L and a capacitor C, and the post-stage power supply module S2 is a typical Buck circuit composed of a switch K2, a diode D, an inductor L and a capacitor C. The capacitor Co is an output filter capacitor.

The waveform diagram (b) in FIG. 8 shows a current $i_{load}$ applied to the chip 1, a current flowing through the inductor L in the post-stage power supply module S1, that is, the output current $i_{S1}$, and a current flowing through the inductor L in the post-stage power supply module S2, that is, the output current $i_{S2}$, changing along with time.

Specifically, the chip 1 can be equivalent to a current source load having a high frequency variation, and the current flowing through it is $i_{Load}$. The waveform diagram (b) in FIG. 8 shows the responses of the output current $i_{S1}$ of the post-stage power supply module S1 and the output current $i_{S2}$ of the post-stage power supply module S2 in the case of different $i_{Load}$.

Before the time t1, that is, at time t<t1, Load is in a steady-state, at which time the post-stage power supply modules S1 and S2 each bears a portion of the current, here, $i_{S1} > i_{S2}$.

At time t1, $i_{Load}$ begins to change dynamically. Since the operating frequency of the post-stage power supply module S2, that is, its switching frequency, is high, it has a faster dynamic response than that of the post-stage power supply module S1, so, $i_{S2}$ changes rapidly following the change of $i_{Load}$ the change of $i_{S1}$ is relatively slow.

At time t2, $i_{Load}$ is ready to enter into another steady-state.

At time t3, that is, time t>t2, both $i_{S1}$ and $i_{S2}$ have entered into a steady-state, restoring the state of $i_{S1} > i_{S2}$.

In the above courses, in the steady-state of the load of the chip 1, the post-stage power supply module S1 takes on more load current, and in the dynamic-state of the load of the chip 1, the post-stage power supply module S2 takes on more variation portion of the load current.

Usually, the dynamic response speed of a power supply is positively related to its operating frequency, i.e., its switching frequency, but is contradictory to power conversion efficiency. That is, a power supply with a high switching frequency, such as the post-stage power supply module S2, is usually more inefficient than a power supply with a low switching frequency, such as the post-stage power supply module S1, so it is difficult for a single post-stage power supply module to simultaneously balance dynamic response speed and conversion efficiency. However, the system of providing power to a chip on a mainboard according to the embodiment can exert the respective advantages of the two power supplies. The system of providing power to a chip on a mainboard according to the embodiment converts a majority of the electric energy with the high efficiency post-stage power supply module S1, and the efficiency of the post-stage power supply module S2 has little influence on the overall conversion efficiency. At the same time, the system of providing power to a chip on a mainboard according to the embodiment responds to a majority of the load dynamic changes with the fast-dynamic-response post-stage power supply module S2, so as to improve the overall dynamic response performance of the power supply system. Since the post-stage power supply module S2 bears more power conversion only during the dynamic change of the load, the heat generation of the post-stage power supply module S2 is less than that of the post-stage power supply module S1, therefore, the requirement for heat dissipation of the post-stage power supply module S2 is lower than that of the post-stage power supply module S1, so the post-stage power supply module S2 can be implemented in a smaller volume or can be suitable for installation in a location with poor heat dissipation. In addition, the further reduction in the volume of the post-stage power supply module S2 can further reduce the distance between the post-stage power supply module S2 and the chip 1, so as to reduce the path impedance of the transmission path, that is, the transmission impedance.

In addition, the present disclosure can control the first post-stage power supply module 30 and the second post-stage power supply module 31 in a variety of manners.

Figure 9:
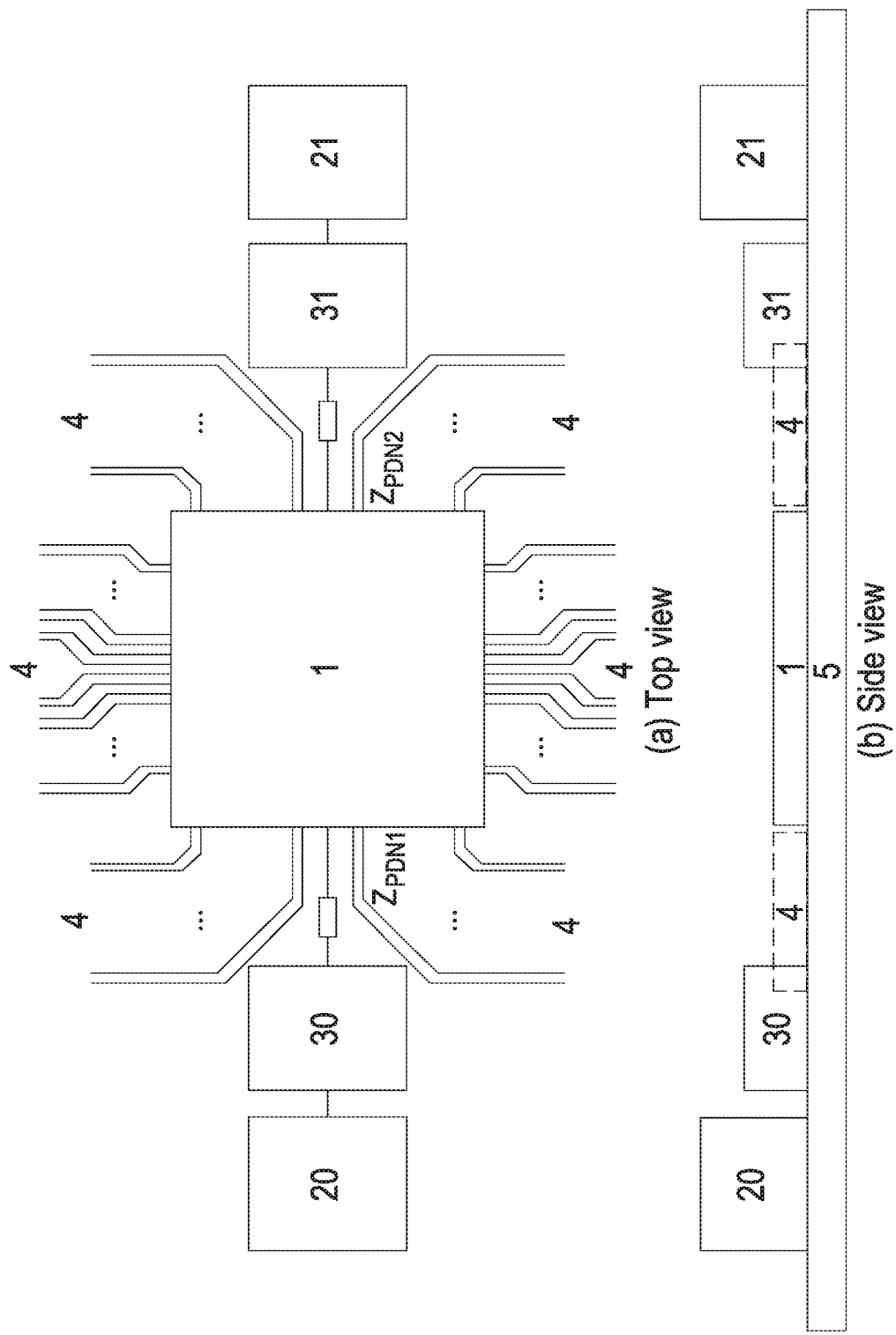
FIG. 9 is a schematic diagram of the spatial arrangement of a system of providing power to a chip on a mainboard according to another embodiment of the present disclosure.

FIG. 9 is a schematic diagram of the spatial arrangement of a system of providing power to a chip on a mainboard according to another embodiment of the present disclosure. Different from the previous embodiments in which one preceding-stage power supply module corresponds to a plurality of post-stage power supply modules, the embodiment of FIG. 9 provides a scheme in which a plurality of preceding-stage power supply modules respectively corresponding to one or more post-stage power supply modules.

As shown in the top view (a) and the side view (b) of FIG. 9, the system of providing power to a chip on a mainboard according to the embodiment of the present disclosure includes a first preceding-stage power supply module 20, a second preceding-stage power supply module 21, a first post-stage power supply module 30, and a second post-stage power supply module 31, all of which are DC-DC converters for supplying power to the chip 1 disposed on the mainboard 5, wherein the chip 1 is, for example, a processor chip.

Both the first preceding-stage power supply module 20 and the second preceding-stage power supply module 21 are located on the mainboard 5, and both are configured to receive a first DC voltage (e.g., 400V, 48V, 12V, etc.), the first preceding-stage power supply module 20 provides a second DC voltage (e.g., 12V, 6V, 3.3V, etc.), the second preceding-stage power supply module 21 provides a third DC voltage (e.g., 12V, 6V, 3.3V, etc.), and the first DC voltage is greater than the second DC voltage and the third DC voltage. The second DC voltage and the third DC voltage may be the same or different.

Both the first post-stage power supply module 30 and the second post-stage power supply module 31 are located on the mainboard 5, wherein the first post-stage power supply module 30 is electrically connected to the first preceding-stage power supply module 20 to receive the second DC voltage, the second post-stage power supply module 31 is electrically connected to the second preceding-stage power supply module 21 to receive the third DC voltage, the first post-stage power supply module 30 is disposed at the first side of the chip 1, the second post-stage power supply module 31 is disposed at the second side of the chip 1, the distance on the mainboard 5 between the first post-stage power supply module 30 and the chip 1 is less than or equal to the distance between the first preceding-stage power supply module 20 and the chip 1, and the distance on the mainboard 5 between the second post-stage power supply module 31 and the chip 1 is less than or equal to the distance between the second preceding-stage power supply module 21 and the chip 1, the first post-stage power supply module 30 provides a fourth DC voltage to the chip 1, the second DC voltage is greater than the fourth DC voltage (for example, 2V), the second post-stage power supply module 31 provides a fifth DC voltage to the chip 1, and the third DC voltage is greater than the fifth DC voltage (for example, 1V). The fourth DC voltage and the fifth DC voltage may be the same or different. The high speed signal lines 4 are the same as the above, and will not be repeated here.

Figure 10:
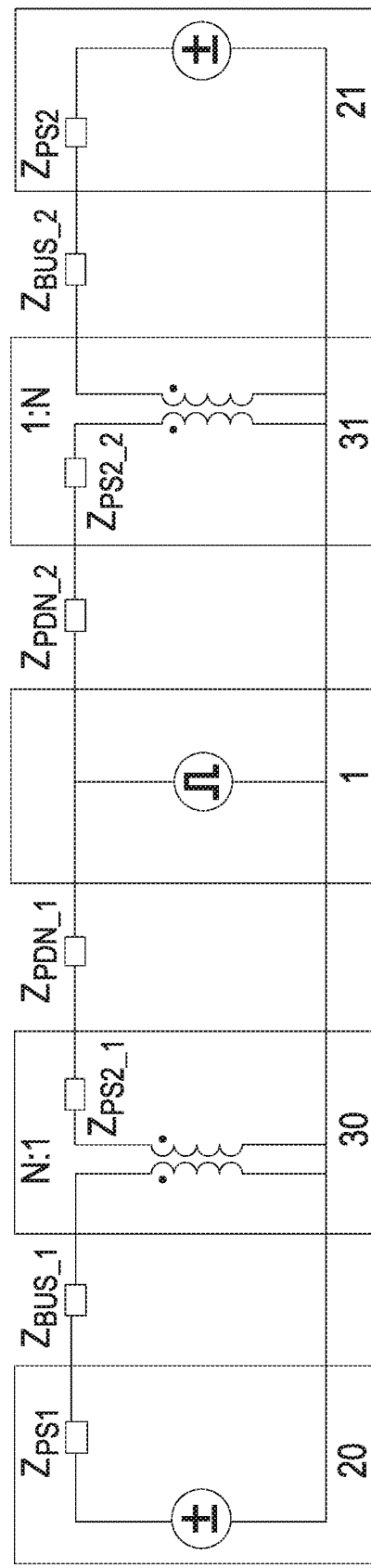
FIG. 10 is an equivalent circuit diagram of the system of providing power to a chip on a mainboard in FIG. 9.

FIG. 10 is an equivalent circuit diagram of the system of providing power to a chip on a mainboard in FIG. 9. As shown in FIG. 10, in the power supply structure shown in FIG. 9, the power supply impedance is composed of the following parts: the equivalent output impedance $Z_{PS1}$ of the first preceding-stage power supply module 20, the impedance $Z_{BUS\_1}$ of the intermediate low-voltage bus line between the first preceding-stage power supply module 20 and the first post-stage power supply module 30, the equivalent output impedance $Z_{PS2\_1}$ of the first post-stage power supply module 30, the transmission impedance $Z_{PDN\_1}$ between the first post-stage power supply module 30 and the chip 1, the equivalent output impedance $Z_{PS2}$ of the second preceding-stage power supply module 21, the impedance $Z_{BUS\_2}$ of the intermediate low-voltage bus line between the second preceding-stage power supply module 21 and the second post-stage power supply module 31, the equivalent output impedance $Z_{PS2\_2}$ of the second post-stage power supply module 31, and the transmission impedance $Z_{PDN\_2}$ between the second post-stage power supply module 31 and the chip 1. In FIG. 10, the first post-stage power supply module 30 is equivalent to a model in which an ideal transformer having a certain voltage conversion ratio is connected in series with an equivalent output impedance $Z_{PS2\_1}$, and the second post-stage power supply module 31 is equivalent to a model in which an ideal transformer having a certain voltage conversion ratio is connected in series with an equivalent output impedance $Z_{PS2\_2}$, where N represents the multiple of the respective input voltages to the corresponding output voltages of the first post-stage power supply module 30 and the second post-stage power supply module 31 respectively.

In the embodiment of FIG. 9, the preceding-stage power supply module 2 is divided into two parts, that is, a first preceding-stage power supply module 20 and a second preceding-stage power supply module 21, and are disposed on two sides of the chip 1 respectively.

Compared with the system of providing power to a chip on a mainboard according to the embodiments of the present disclosure shown in FIG. 7, in the system of providing power to a chip on a mainboard according to the embodiment of the present disclosure shown in FIG. 9, the power supply structure and impedance of the two sides of the chip 1 are symmetrical, so that load balance in the power supply paths of the two sides of the chip 1 can be easily realized in both steady-state and dynamic-state, thereby maximally utilizing the capacity and performance of the power supply.

In addition, the connection paths between the first preceding-stage power supply module 20 and the second preceding-stage power supply module 21 and the corresponding first post-stage power supply module 30 and second post-stage power supply module 31 in the system of providing power to a chip on a mainboard according to the embodiment of the present disclosure shown in FIG. 9 become short, so that the impedances $Z_{BUS\_1}$ and $Z_{BUS\_2}$ of the corresponding intermediate bus lines become small.

Further, projections of the first preceding-stage power supply module 20 and the first post-stage power supply module 30 on the chip are overlapped with each other over 50%, and projections of the second preceding-stage power supply module 21 and the second post-stage power supply module 31 on the chip are overlapped with each other over 50%. The ratio value of the overlapped area of the projections of the first preceding-stage 20 and post-stage power supply modules 30 on a side surface of the first preceding-stage power supply module 20 to the projection of the first post-stage power supply module 30 on that side surface is over 50%. Similarly, the ratio value of the overlapped area of the projections of the second preceding-stage and post-stage power supply modules 21 and 31 on a side surface of the second preceding-stage power supply module 21 to the projection of the second post-stage power supply module 31 on that side surface is over 50%. In other words, the profile projection of the preceding-stage power supply module 20 or 21 and the corresponding post-stage power supply module 30 or 31 are overlapped with each other over 50%. In other words, the profile projection can be considered the projection on the side surface of the first preceding-stage power supply module.

Further, in some embodiments, the connection impedance between the preceding-stage power supply module and the post-stage power supply module is less than 10% of the open-loop output impedance of the preceding-stage power supply module. The connection impedance between the preceding-stage power supply module and the post-stage power supply module refers to the impedance $Z_{BUS\_1}$ of the intermediate low-voltage bus line between the first preceding-stage power supply module 20 and the first post-stage power supply module 30. The open-loop output impedance of the preceding-stage power supply module refers to the output impedance measured when the working state of the preceding-stage power supply module is fixed, for example, the output impedance measured when the duty cycle of the preceding-stage power supply module is fixed. The output impedance includes impedance of electronic components, magnetic core components and connection of PCB, etc.

If the connection impedance is greater than 10% of the open-loop output impedance of the preceding-stage power supply module, the loss from the input power to the preceding-stage power supply module will increase greater than 10%. So reducing the connection impedance is helpful to decrease the system loss. Meanwhile, the dynamic response ability of the system can be improved by more than 5%.

Figure 11:
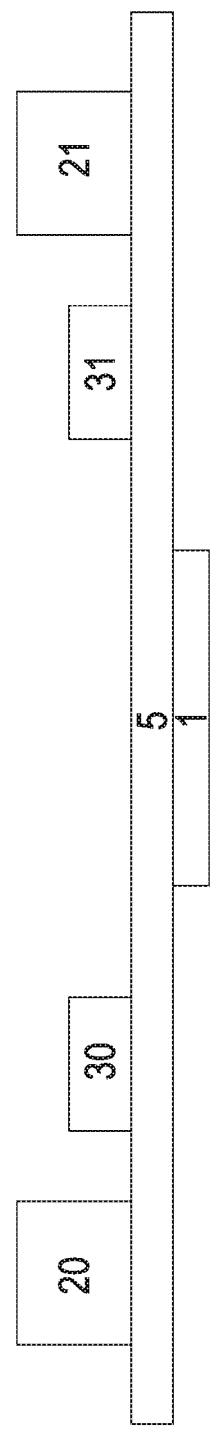
FIG. 11 is a schematic diagram of the spatial arrangement of a system of providing power to a chip on a mainboard according to further another embodiment of the present disclosure.

In some embodiments, the chip 1 is located on the same surface of the mainboard with the preceding-stage power supply module 20 and the post-stage power supply module 30, as shown in FIG. 9. In some embodiments, the chip 1 is located on an opposite surface of the mainboard with the preceding-stage power supply module 20 and the post-stage power supply module 30, as shown in FIG. 11.

Figure 12:
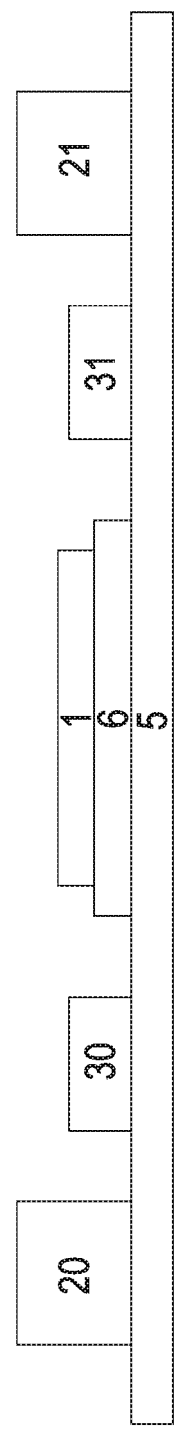
FIG. 12 is a schematic diagram of the spatial arrangement of a system of providing power to a chip on a mainboard according to still another embodiment of the present disclosure.

In some embodiments, the chip 1 is disposed on a chip board 6, and the chip board 6 is assembled on the mainboard 5, as shown in FIG. 12.

Figure 13:
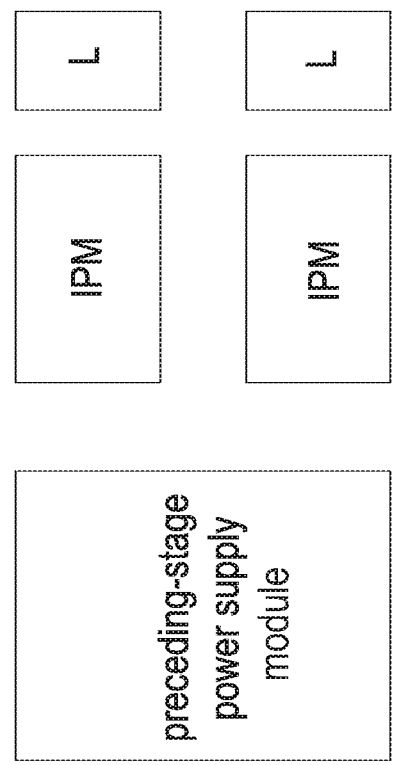
FIG. 13 schematically shows the spatial arrangement of the preceding-stage and post-stage power supply modules.

Further, in some embodiments, the preceding-stage and post-stage power supply modules are molding power modules or open-frame power modules. The post-stage power supply module may be a Buck converter which has inductors, and at least two switches connected in series. The inductor and the two switches may be packaged into one module or may dispose on the mainboard separately as discrete components. For example, as shown in FIG. 13, IPM (Intelligent Power Module) includes at least one switch component, such as a plastic package module of a half bridge, and L is the inductor. IPM and L are disposed separately to form a post-stage power supply module rather than packaged in one module.

Figure 14:
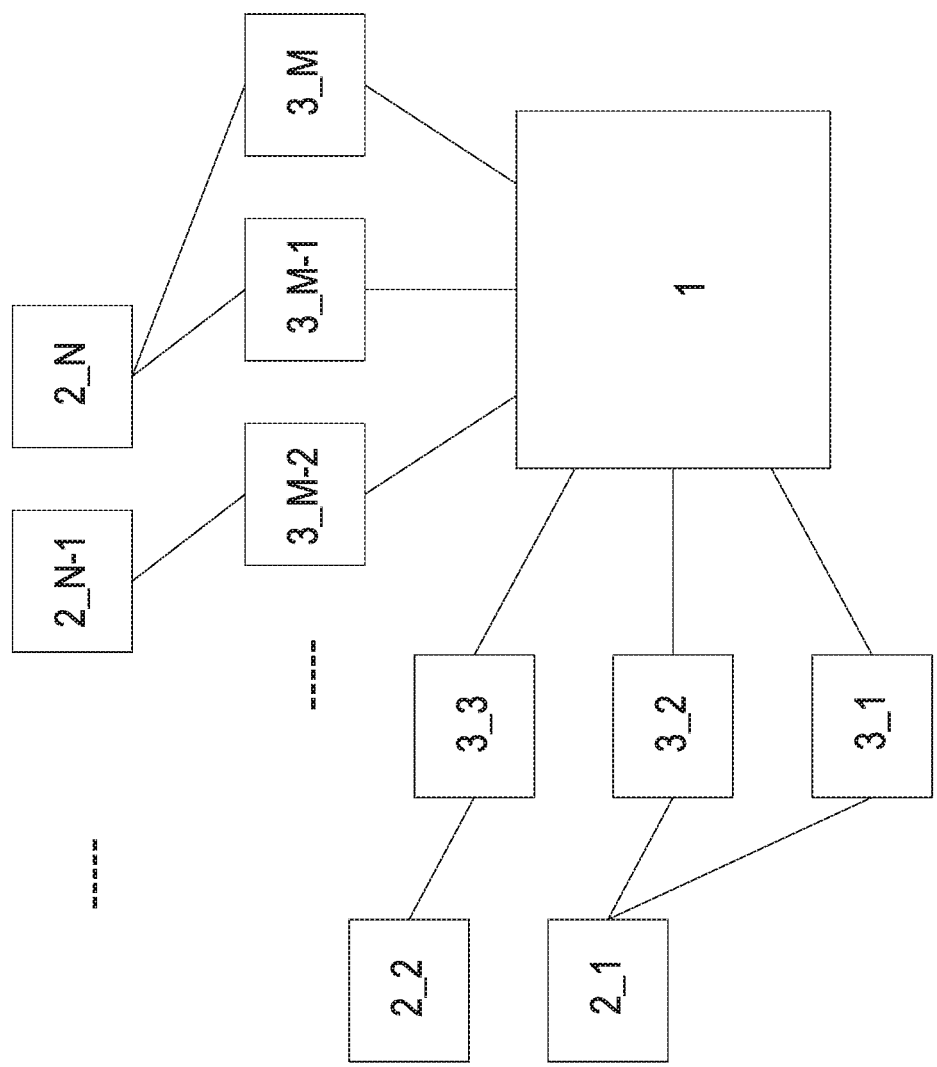
FIG. 14 is a topological view of a schematic diagram of the spatial arrangement of a system of providing power to a chip on a mainboard according to still another embodiment of the present disclosure.

FIG. 14 is a topological view of a schematic diagram of the spatial arrangement of a system of providing power to a chip on a mainboard according to still another embodiment of the present disclosure. As shown in FIG. 14, the system of providing power to a chip on a mainboard according to the embodiment of the present disclosure includes: N preceding-stage power supply modules 2_1, 2_2 . . . 2_N-1 and 2_N and M post-stage power supply modules 3_1, 3_2, 3_3 . . . 3_M-2, 3_M-1 and 3_M, for supplying power to a chip 1 disposed on a mainboard, wherein N is a positive integer, M is an integer not less than N and not less than 3, the chip 1 is, for example, a processor chip, and the processor chip may be a multi-core processor.

All of the N preceding-stage power supply modules are located on the mainboard, all of which are DC-DC converters, configured to receive a first DC voltage, and provide second DC voltages, and the first DC voltage is greater than the second DC voltages.

All of the M post-stage power supply modules are located on the mainboard, all of which are DC-DC converters, wherein the M post-stage power supply modules are electrically connected to the corresponding N preceding-stage power supply modules respectively, to receive the second DC voltages. A first group (for example, 3_1, 3_2 and 3_3) of the M post-stage power supply modules is disposed at a first side of the chip 1, a second group (for example, 3_M-2, 3_M-1) and 3_M) of the M post-stage power supply modules is disposed at a second side of the chip 1, and all of the distances between the M post-stage power supply modules on the mainboard and the chip 1 are less than or equal to the distances between the N preceding-stage power supply modules on the mainboard and the chip 1. The M post-stage power supply modules respectively provide a third DC voltage to an (M+2)th DC voltage to the chip 1, and each of the second DC voltages is greater than the third DC voltage to the (M+2)th DC voltage. One preceding-stage power supply module can be connected to one or more post-stage power supply modules.

As an embodiment, in the system of providing power to a chip on a mainboard according to the embodiment of the present disclosure shown in FIG. 14, the first side and the second side are adjacent or opposite sides of the chip 1. The power supply structures on the two sides of the chip 1 may be asymmetric, the post-stage power supply modules on the two sides of the chip 1 may have different output impedances, operating frequencies, power levels, and the like, and the preceding-stage power supply modules on the two sides of the chip 1 may have different output impedances, operating frequencies, power levels, and the like. The voltages on the intermediate low-voltage bus lines between the preceding-stage power supply modules and the corresponding post-stage power supply modules on the two sides of the chip 1 can be different.

Figure 15:
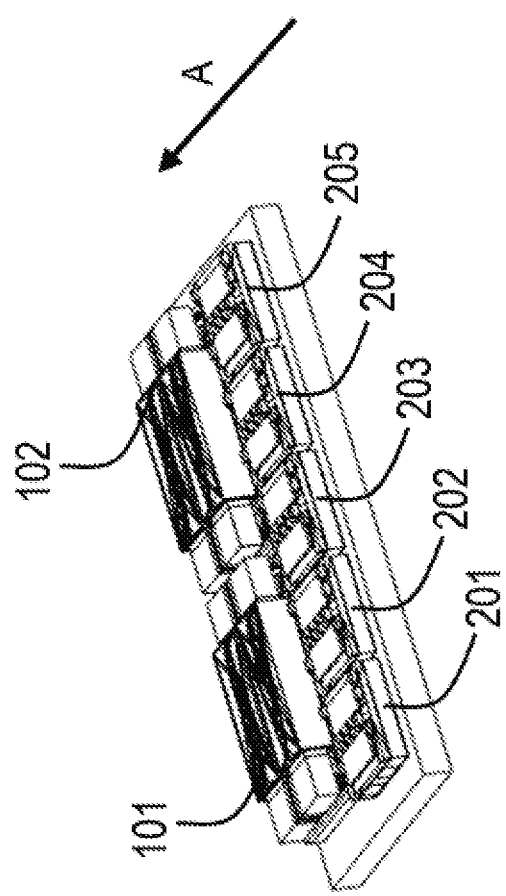
FIG. 15 is a schematic perspective view of a partial structure of a system of providing power to a chip on a mainboard according to still another embodiment of the present disclosure.
Figure 16:
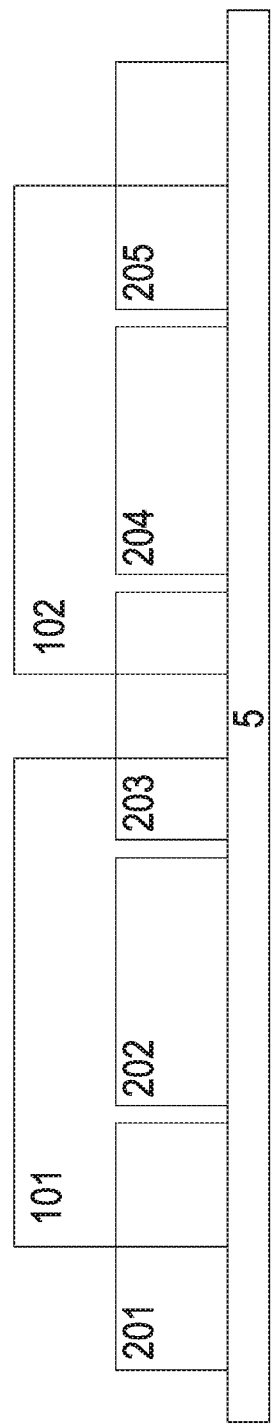
FIG. 16 is a schematic diagram of the spatial arrangement of a system of providing power to a chip on a mainboard of FIG. 15.

FIG. 15 is a partial structural schematic diagram of the system of providing power, as shown in FIG. 15, the system of providing power to load e.g. a chip on a mainboard of the present disclosure includes two preceding-stage power supply modules 101, 102, and five post-stage power supply modules 201-205 for providing power to a chip. The preceding-stage and post-stage power supply modules are disposed on the same plane and are electrically connected to each other through the wiring on the mainboard 5. Compared with the two preceding-stage power supply modules 101 and 102, the five post-stage power supply modules 201-205 are closer to the load. Each of the preceding-stage and post-stage power supply modules 101, 102 and 201-205 has a top surface, a bottom surface and four side surfaces, and all the bottom surfaces are contacted with the mainboard 5. FIG. 16 schematically shows the projections of the preceding-stage and post-stage power supply modules 101, 102 and 201-205 on one side surface of the preceding-stage power supply module 101 or 102 with respect to the viewing angle A of FIG. 15. The ratio value of the overlapped area of the projections of the preceding-stage and post-stage power supply modules 101, 102 and 201-205 on a side surface of the preceding-stage power supply module 101 or 102 to the projection of at least one of the post-stage power supply modules 201-205 on that side surface is over 50%. As the power module is closer to the load, the transmission path is shorter. Therefore, the voltage drop on the transmission path is reduced, and the dynamic response performance of the power module is improved, which is beneficial for the load performance. Moreover, the impedance on the transmission path is smaller, which reduces the transmission loss. In addition, the preceding-stage power supply module needs to be close to the post-stage power supply module so as to achieve better dynamic response performance and less transmission loss. Since the space around the load for disposing power module is small, the power density and current density of the preceding-stage and post-stage power supply modules have to be large. When the said ratio value is larger than 50%, the preceding-stage and post-stage power supply modules 101, 102 and 201-205 are close enough, and the power density and current density thereof are large enough to be adaptive to the narrow space around the load.

As an embodiment, the intermediate low-voltage bus line between the first preceding-stage power supply module 20 and the first post-stage power supply module 30 and the intermediate low-voltage bus line between the second preceding-stage power supply module 21 and the second post-stage power supply module 31 may be cancelled, so as to save the system resources.

As an embodiment, if the distance between the preceding-stage power supply module and the post-stage power supply module is sufficiently close, the preceding-stage power supply module and the post-stage power supply module can share a heat sink, so as to reduce the cost of the power supply system.

In order to realize load current distribution of the preceding-stage power supply modules and the post-stage power supply modules on the two sides of the chip 1 or to monitor the amount of load on the two sides of the chip 1, current sampling can be respectively performed on the power supply structures on the two sides of the chip 1. In this embodiment, current sampling can be respectively performed on the intermediate low-voltage bus line between the first preceding-stage power supply module 20 and the first post-stage power supply module 30 and the intermediate low-voltage bus line between the second preceding-stage power supply module 21 and the second post-stage power supply module 31, without sampling the output currents of the first post-stage power supply module 30 and the second post stage power supply 31. Since the output currents of the first post-stage power supply module 30 and the second post-stage power supply module 31 are higher than the currents on the corresponding intermediate low-voltage bus lines, current sampling on the intermediate low-voltage bus lines can reduce the loss and difficulty of sampling.

The power supply structures on the two sides of the chip 1 may be asymmetric, the first post-stage power supply module 30 and the second post-stage power supply module 31 on the two sides of the chip 1 may have different output impedances, operating frequencies, power levels, and the like, and the first preceding-stage power supply module 20 and the second preceding-stage power supply module 21 on the two sides of the chip 1 may have different output impedances, operating frequencies, power levels, and the like. The voltages on the intermediate low-voltage bus lines on the two sides of the chip 1 can be different.

In order to further reduce the impedance between the preceding-stage power supply modules and the post-stage power supply modules, the preceding-stage power supply modules and the post-stage power supply modules can be located on different surfaces of the mainboard of the system, so that the projections of both on the mainboard are closer, partially overlapped or even completely overlapped. When the preceding-stage power supply module and/or the post-stage power supply module at one side of the chip 1 are composed of a plurality of power supply modules, these power supply modules can be located on different surfaces of the mainboard of the system.

Figure 17:
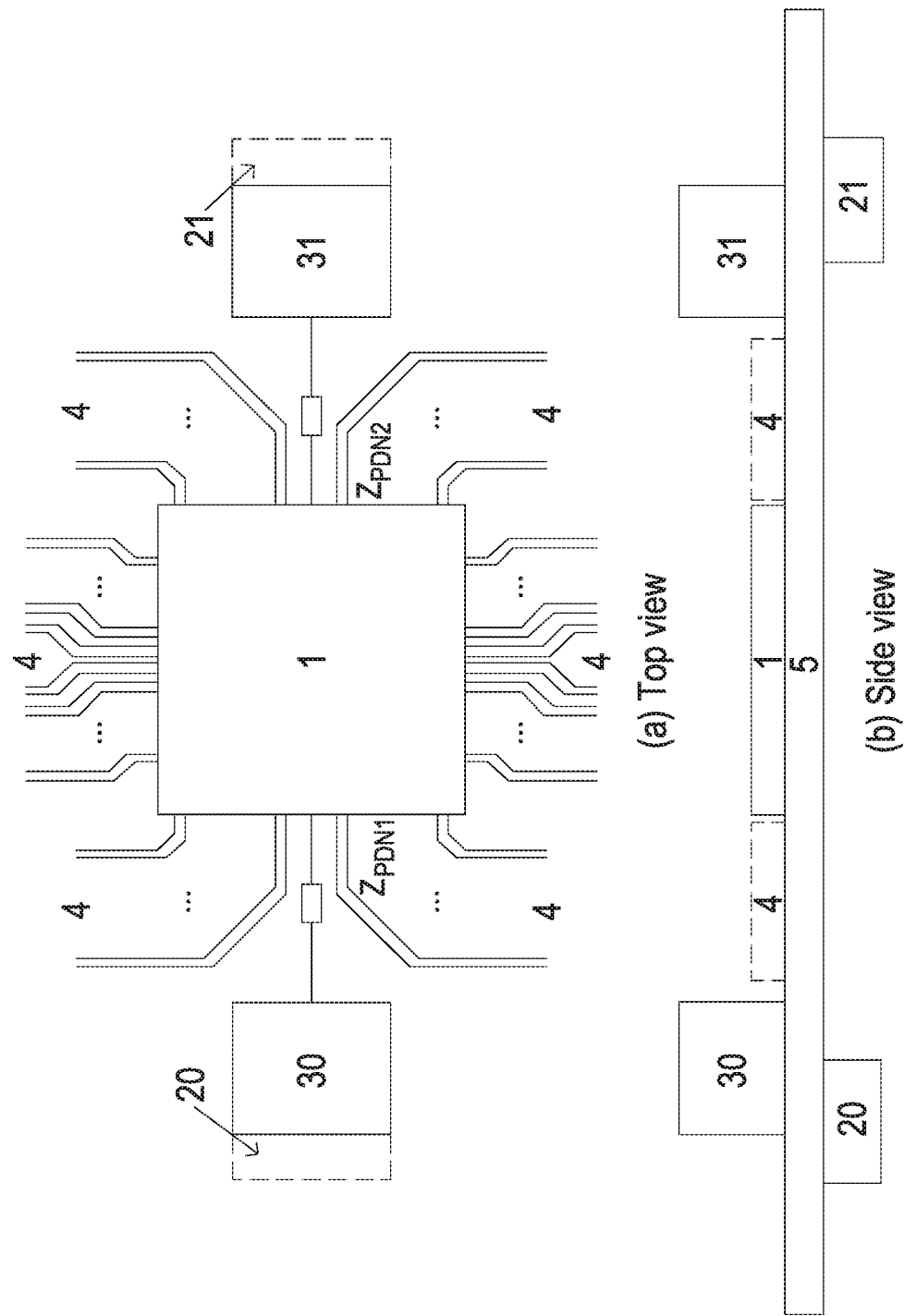
FIG. 17 is a schematic diagram of the spatial arrangement of a system of providing power to a chip on a mainboard according to further another embodiment of the present disclosure.

FIG. 17 is a schematic diagram of the spatial arrangement of a system of providing power to a chip on a mainboard according to further another embodiment of the present disclosure. As shown in the top view (a) and the side view (b) of FIG. 17, the first post-stage power supply module 30 is located on a first side of the mainboard 5, such as the upper surface, the first preceding-stage power supply module 20 is located on a second side of the mainboard 5, for example, the lower surface, the projections of the first preceding-stage power supply module 20 and the first post-stage power supply module 30 on the mainboard 5 are overlapped with each other over 50%; and the second post-stage power supply module 31 is located on the first side of the mainboard 5, the second preceding-stage power supply module 21 is located on the second side of the mainboard 5, the projections of the second preceding-stage power supply module 21 and the second post-stage power supply module 31 on the mainboard 5 are overlapped with each other over 50%. In specific, the ratio value of the overlapped area of the projections of the first preceding-stage and post-stage power supply modules 20 and 30 on the mainboard 5 to the projection of the first post-stage power supply module 30 on the mainboard 5 is larger than 50%, and the ratio value of the overlapped area of the projections of the second preceding-stage and post-stage power supply modules 21 and 31 on the mainboard 5 to the projection of the second post-stage power supply module 31 on the mainboard 5 is larger than 50%.

Similarly, in some embodiments, the connection impedance between the preceding-stage power supply module and the post-stage power supply module is less than 10% of the open-loop output impedance of the preceding-stage power supply module. The connection impedance between the preceding-stage power supply module and the post-stage power supply module can refer to the impedance $Z_{BUS\_1}$ of the intermediate low-voltage bus line between the first preceding-stage power supply module 20 and the first post-stage power supply module 30. The open-loop output impedance of the preceding-stage power supply module can refer to the output impedance measured when the working state of the preceding-stage power supply module is fixed, for example, the output impedance measured when the duty cycle of the preceding-stage power supply module is fixed. The output impedance includes impedance of electronic components, magnetic core components and connection of PCB, etc.

If the connection impedance is greater than 10% of the open-loop output impedance of the preceding-stage power supply module, the loss from the input power to the preceding-stage power supply module will increase greater than 10%. So reducing the connection impedance is helpful to decrease the system loss. Meanwhile, the dynamic response ability of the system can be improved by more than 5%.

Figure 18:
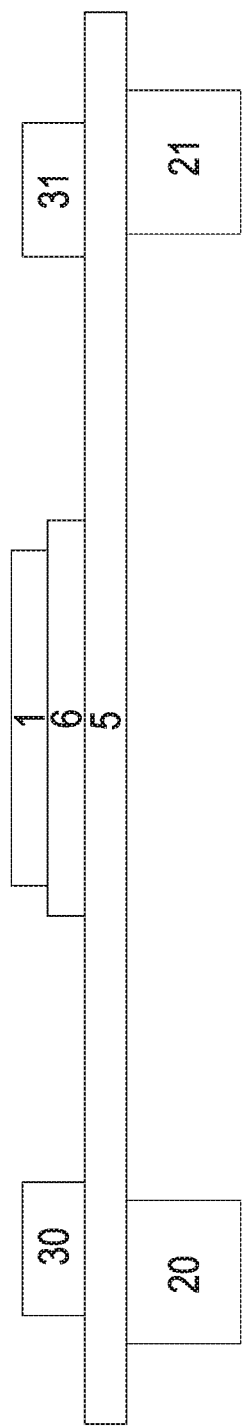
FIG. 18 is a schematic diagram of the spatial arrangement of a system of providing power to a chip on a mainboard according to still another embodiment of the present disclosure.

Further, the chip 1 is disposed on a chip board 6, and the chip board 6 is assembled with the mainboard 5, as shown in FIG. 18.

Figure 19:
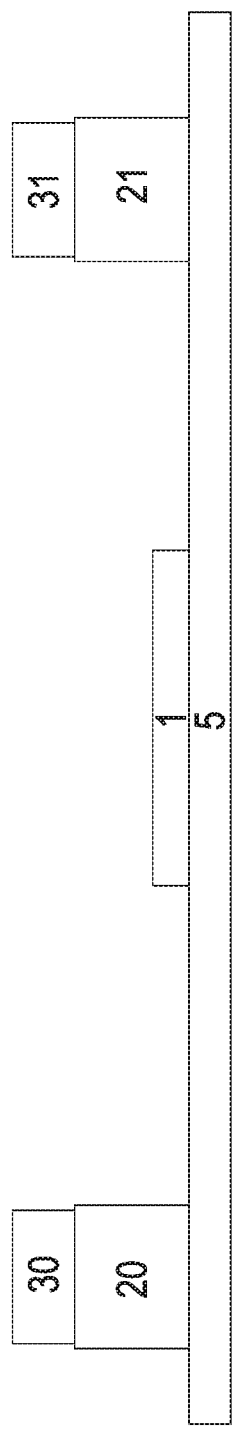
FIG. 19 is a schematic diagram of the spatial arrangement of a system of providing power to a chip on a mainboard according to still another embodiment of the present disclosure.
Figure 20:
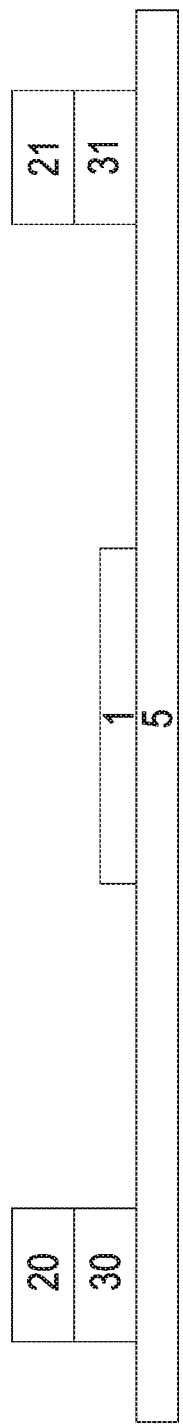
FIG. 20 is a schematic diagram of the spatial arrangement of a system of providing power to a chip on a mainboard according to still another embodiment of the present disclosure.

In some embodiments, as shown in FIGS. 19-20, the first preceding-stage power supply module 20 and the first post-stage power supply module 30 are located on same side of the mainboard 5, such as the upper surface; and the second preceding-stage power supply module 21 and the second post-stage power supply module 31 are located on same side of the mainboard 5. Wherein, in FIG. 20, the first preceding-stage power supply module 20 is stacked on the first post-stage power supply module 30; in FIG. 19, the first post-stage power supply module 30 is stacked on the first preceding-stage power supply module 20.

Figure 21:
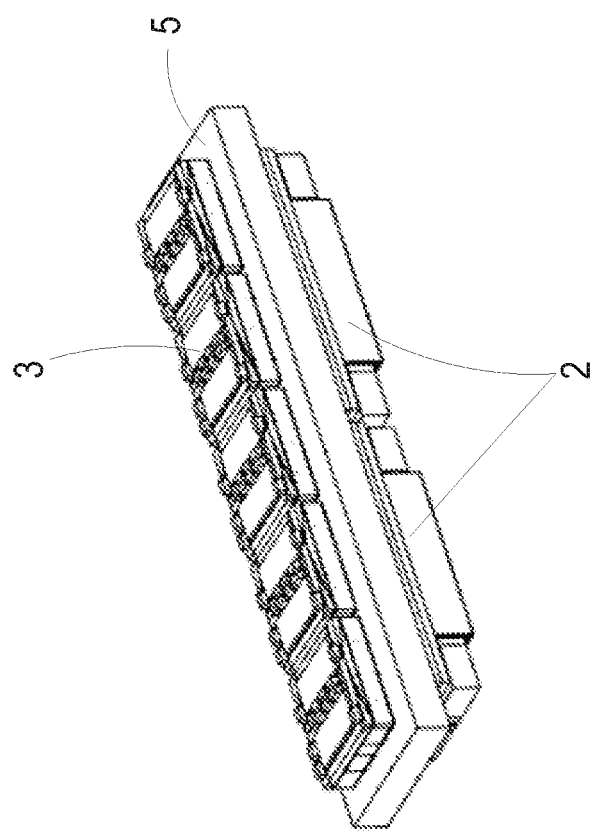
FIG. 21 is a schematic perspective view of a partial structure of a system of providing power to a chip on a mainboard according to still another embodiment of the present disclosure.

FIG. 21 is a schematic perspective view of a partial structure of a system of providing power to a chip on a mainboard according to still another embodiment of the present disclosure. With respect to the load, the stacked preceding-stage and post-stage power supply modules 2 and 3 may be located at the same side or be located at different sides of the mainboard 5. The preceding-stage and post-stage power supply modules 2 and 3 may be located at the left side of the chip 1, and the post-stage power supply module 3 receives and converts the output from the preceding-stage power supply module 2 and supplies the converted power to the chip 1. Similarly, the preceding-stage and post-stage power supply modules 2 and 3 may be located at the right side of the chip 1, and the post-stage power supply module 3 receives and converts the output from the preceding-stage power supply module 2 and supplies the converted power to the chip 1. In addition, the input ports of the preceding-stage power supply modules 2 at the right and left sides of the chip 1 may be connected in parallel or receive different input respectively. The output ports of the post-stage power supply modules 3 at the right and left sides of the chip 1 may be connected in parallel to supply the chip 1 or supply the different areas of the chip 1 respectively. The stacked preceding-stage and post-stage power supply modules 2 and 3 may be located at any two sides of the load. Under this structure, the volume and occupied area of the preceding-stage and post-stage power supply modules 2 and 3 are reduced. Therefore, the power module can be closer to the load, which reduces the parasitic parameter between the post-stage power supply module 3 and the load and improve the dynamic response performance. Further, by stacking the preceding-stage and post-stage power supply modules 2 and 3, the distance between the preceding-stage and post-stage power supply modules 2 and 3 is greatly reduced, thus the parasitic parameter between the output of the preceding-stage power supply module 2 and the input of the post-stage power supply module 3. Therefore, the affection of this parasitic parameter to the output post-stage power supply module 3 (e.g., the dynamic response performance) is reduced.

The first preceding-stage power supply module 20, the second preceding-stage power supply module 21, the first post-stage power supply module 30 and the second post-stage power supply module 31 on the two sides of the mainboard 5 may have different output impedances, operating frequencies and power levels.

Compared with the system of providing power to a chip on a mainboard according to the embodiments of the present disclosure shown in FIG. 7, the system of providing power to a chip on a mainboard according to the embodiments of the present disclosure shown in FIGS. 9 and 17 can minimize the impedance between the preceding-stage power supply module and the post-stage power supply module, and realize the balance of power supply impedance on the two sides of the processor chip, thereby better exerting the performance of the post-stage power supply module with high frequency.

Figure 22:
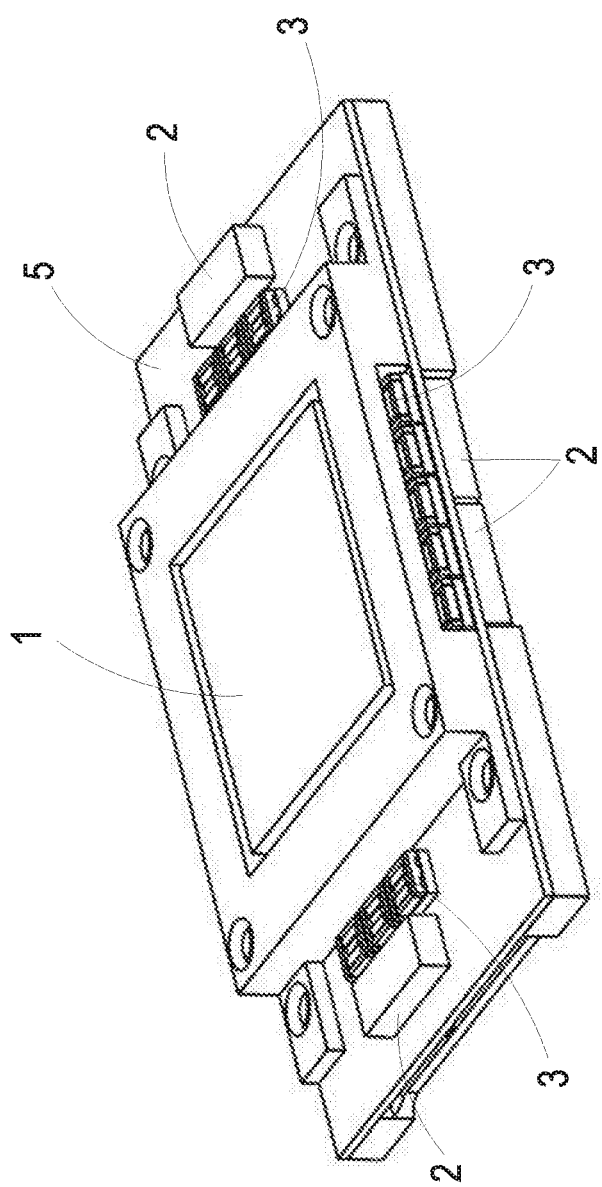
FIG. 22 is a schematic perspective view of a system of providing power to a chip on a mainboard according to still another embodiment of the present disclosure.

Moreover, in an embodiment, the spatial arrangements shown in FIGS. 15 and 21 can be combined. FIG. 22 is a schematic perspective view of a system of providing power to a chip on a mainboard according to still another embodiment of the present disclosure. As shown in FIG. 22, the arrangement of the preceding-stage power supply modules 2 and post-stage power supply modules 3 includes the placement in FIG. 15 and the placement in FIG. 21. Wherein, the system of providing power to a chip 1 on a first side of a mainboard 5 includes N preceding-stage power supply modules 2 and M post-stage power supply modules 3, where N is a positive integer and M is an integer not less than N and not less than 3. The N preceding-stage power supply modules 2 are DC-DC converters and are configured to receive a first DC voltage. A first group of the N preceding-stage power supply modules 2 is located on the first side of the mainboard 5, and a second group of the N preceding-stage power supply modules 2 is located on a second side of the mainboard 5. Each preceding-stage power supply module 2 provides a second DC voltage, and the first DC voltage is greater than the second DC voltage. The M post-stage power supply modules 3 are DC-DC converters located on the first side of the mainboard 5. The M post-stage power supply modules 3 are electrically connected to the corresponding N preceding-stage power supply modules 2 respectively to receive the second DC voltage. A first group of the M post-stage power supply modules 3 is disposed at a first side of the chip 1, and a second group of the M post-stage power supply modules 3 is disposed at a second side of the chip 1. Distances on the mainboard 5 between the M post-stage power supply modules 3 and the chip 1 are less than distances on the mainboard 5 between the N preceding-stage power supply modules 2 and the chip 1. The M post-stage power supply modules 3 respectively provide a third DC voltage to an (M+2)th DC voltage to the chip 1, and the second DC voltage is greater than the third DC voltage to the (M+2)th DC voltage.

As an embodiment, the first side of the chip 1 and the second side of the chip 1 are adjacent or opposite sides of the chip 1.

As an embodiment, projections of the first group of the N preceding-stage power supply modules 2 and the corresponding post-stage power supply module 3 on the chip 1 are overlapped with each other over 50%.

As an embodiment, projections of the second group of the N preceding-stage power supply modules 2 and the corresponding post-stage power supply module 3 on the mainboard 5 are overlapped with each other over 50%.

As an embodiment, the preceding-stage power supply module 2 is neighboring to the corresponding post-stage power supply module 3.

The power supply structures on the two sides of the chip 1 may be asymmetric, the post-stage power supply modules on the two sides of the chip 1 may have different output impedances, operating frequencies, power levels, and the like, and the preceding-stage power supply modules on the two sides of the chip 1 may have different output impedances, operating frequencies, power levels, and the like. The voltages on the intermediate low-voltage bus lines between the preceding-stage power supply modules and the corresponding post-stage power supply modules on the two sides of the chip 1 can be different. The system of providing power to a chip on a mainboard according to the embodiment of the present disclosure shown in FIG. 12 can adopt the control manners adopted by the system of providing power to a chip on a mainboard according to the embodiments of the present disclosure shown in FIG. 22.

Further, the N preceding-stage power supply modules are designated by the same numeral number, and the M post-stage power supply modules are designated by the same numeral number. However, actually, the N preceding-stage power supply modules and the M post-stage power supply modules may have different output impedances, operating frequencies, power levels, and the like. In addition, the number of the preceding-stage power supply modules and the number of the post-stage power supply modules are not limited to that shown in picture above.

The system of providing power to a chip on a mainboard according to the embodiments of the present disclosure can reduce the impedances between the preceding-stage power supply modules and the post-stage power supply modules, and realize the balance of power supply impedance on the two sides of the processor chip, thereby improving response and frequency characteristics of the power supply, and increasing efficiency of the power supply.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An assembly structure of providing power to a chip, comprising:
    at least one preceding-stage power supply module, located on a surface of a mainboard, being DC-DC converters, and configured to receive a first DC voltage and to provide a second DC voltage; and
    at least one post-stage power supply module, located on the same surface of the preceding-stage power supply module of the mainboard, and being DC-DC converters, wherein the post-stage power supply module is electrically connected to the preceding-stage power supply module to receive the second DC voltage, the preceding-stage power supply module and the post-stage power supply module are disposed at same side of the chip, the post-stage power supply module provides a third DC voltage to the chip, wherein, a profile projection of the preceding-stage power supply module and the corresponding post-stage power supply module are overlapped with each other over 50%.

2. The assembly structure according to claim 1, wherein the chip is located on the same surface of the mainboard with the preceding-stage power supply module and the post-stage power supply module.

3. The assembly structure according to claim 1, wherein the chip is located on an opposite surface of the preceding-stage power supply module and the post-stage power supply module of the mainboard.

4. The assembly structure according to claim 1, wherein the chip is disposed on a chip board, and the chip board is assembled with the mainboard.

5. The assembly structure according to claim 1, wherein the first DC voltage is greater than the second DC voltage, and the second DC voltage is greater than the third DC voltage.

6. The assembly structure according to claim 1, wherein a connection impedance between the preceding-stage power supply module and the post-stage power supply module is less than 10% of an open-loop output impedance of the preceding-stage power supply module.

7. The assembly structure according to claim 1, wherein the preceding-stage power supply module is molding power supply or open-frame power module.

8. The assembly structure according to claim 1, wherein the post-stage power supply module is molding power supply or open-frame power module.

9. The assembly structure according to claim 1, wherein the post-stage power supply module comprises intelligent power module and passive filter.

10. The assembly structure according to claim 1, wherein a profile projection of multiple preceding-stage power supply modules and multiple post-stage power supply modules are overlapped with each other over 50%.

11. An assembly structure of providing power to a chip located on a mainboard, comprising:
    at least one preceding-stage power supply module, being DC-DC converters, and configured to receive a first DC voltage and to provide a second DC voltage; and
    at least one post-stage power supply module, and being DC-DC converters, wherein the post-stage power supply module is electrically connected to the preceding-stage power supply module to receive the second DC voltage, and the post-stage power supply module provides a third DC voltage to the chip, wherein a projection on the mainboard of the preceding-stage power supply module and the corresponding post-stage power supply module are overlapped with each other over 50%.

12. The assembly structure according to claim 11, wherein the preceding-stage power supply module is located on a first surface of the mainboard, and the post-stage power supply module is located on a second surface of the mainboard.

13. The assembly structure according to claim 12, wherein the preceding-stage power supply module comprises a first preceding-stage power supply module and a second preceding-stage power supply module, and the post-stage power supply module comprise a first post-stage power supply module and a second post-stage power supply module; wherein the first preceding-stage power supply module and the first post-stage power supply module are disposed at a first side of the chip, and the second preceding-stage power supply module and the second post-stage power supply module are disposed at a second side of the chip.

14. The assembly structure according to claim 11, wherein the preceding-stage power supply module and the post-stage power supply module are stacked on a surface of the mainboard.

15. The assembly structure according to claim 14, wherein the preceding-stage power supply module comprises a first preceding-stage power supply module and a second preceding-stage power supply module, and the post-stage power supply module comprise a first post-stage power supply module and a second post-stage power supply module; wherein the first preceding-stage power supply module and the first post-stage power supply module are disposed at a first side of the chip, and the second preceding-stage power supply module and the second post-stage power supply module are disposed at a second side of the chip.

16. The assembly structure according to claim 11, wherein the chip is located on the same surface of the post-stage power supply module of the mainboard.

17. The assembly structure according to claim 11, wherein the chip is disposed on a chip board, and the chip board is assembled with the main board.

18. The assembly structure according to claim 11, wherein the first DC voltage is greater than the second DC voltage, and the second DC voltage is greater than the third DC voltage.

19. The assembly structure according to claim 11, wherein a connection impedance between the preceding-stage power supply module and the post-stage power supply module is less than 10% of an open-loop output impedance of the preceding-stage power supply module.

20. The assembly structure according to claim 11, wherein the preceding-stage power supply module is molding power supply or open-frame power module.

21. The assembly structure according to claim 11, wherein the post-stage power supply module is molding power supply or open-frame power module.

22. The assembly structure according to claim 11, wherein a projection on the mainboard of multiple preceding-stage power supply modules and multiple post-stage power supply modules are overlapped with each other over 50%.

* * * * *